(12) United States Patent
Glos et al.

(10) Patent No.: US 12,534,564 B2
(45) Date of Patent: Jan. 27, 2026

(54) PRODUCTION OF RIGID POLYURETHANE FOAM

(71) Applicant: Evonik Operations GmbH, Essen (DE)

(72) Inventors: Martin Glos, Borken (DE); Jobst Grimminger, Ellerau (DE); Michael Ferenz, Essen (DE)

(73) Assignee: Evonik Operations GmbH, Essen (DE)

( * ) Notice: Subject to any disclaimer, the term of this patent is extended or adjusted under 35 U.S.C. 154(b) by 1196 days.

(21) Appl. No.: 17/414,678

(22) PCT Filed: Dec. 16, 2019

(86) PCT No.: PCT/EP2019/085263
§ 371 (c)(1),
(2) Date: Jun. 16, 2021

(87) PCT Pub. No.: WO2020/144003
PCT Pub. Date: Jul. 16, 2020

(65) Prior Publication Data
US 2022/0017679 A1    Jan. 20, 2022

(30) Foreign Application Priority Data
Jan. 7, 2019  (EP) .................................... 19150460

(51) Int. Cl.
*C08G 18/38*     (2006.01)
(52) U.S. Cl.
CPC .. *C08G 18/3893* (2013.01); *C08G 2110/0025* (2021.01)
(58) Field of Classification Search
CPC .... C08G 18/06; C08G 18/0838; C08G 71/04; C08G 77/04; C08G 77/045; C08G 2110/0025; C08L 75/04; C08L 75/12; C08L 83/04; C08L 83/06; C08L 83/12; C08J 2205/10
See application file for complete search history.

(56) References Cited

U.S. PATENT DOCUMENTS

| | | |
|---|---|---|
| 3,879,433 A | 4/1975 | Omietanski et al. |
| 3,900,424 A | 8/1975 | Inoue et al. |
| 3,953,383 A | 4/1976 | Inoue et al. |
| 4,042,540 A | 8/1977 | Lammerting et al. |
| 4,412,081 A | 10/1983 | Williams |
| 4,478,957 A | 10/1984 | Klietsch et al. |
| 4,500,704 A | 2/1985 | Kruper et al. |
| 4,751,251 A | 6/1988 | Thornsberry |
| 5,064,870 A | 11/1991 | Kollmeier et al. |
| 5,096,933 A | 3/1992 | Volkert |
| 5,310,766 A | 5/1994 | Baumann et al. |
| 5,633,292 A | 5/1997 | Bruene et al. |
| 5,844,010 A | 12/1998 | Burkhart et al. |
| 5,852,065 A | 12/1998 | Frey et al. |
| 5,990,187 A | 11/1999 | Boinowitz et al. |
| 6,506,810 B2 | 1/2003 | Borgogelli et al. |
| 7,138,552 B2 | 11/2006 | Kaizik et al. |
| 7,157,541 B2 | 1/2007 | Knott et al. |
| 7,605,284 B2 | 10/2009 | Brueckner et al. |
| 7,671,104 B2 | 3/2010 | Heinemann et al. |
| 7,838,566 B2 | 11/2010 | Glos et al. |
| 7,872,055 B2 | 1/2011 | Burdeniuc et al. |
| 8,030,366 B2 | 10/2011 | Ferenz et al. |
| 8,138,294 B2 | 3/2012 | Henning et al. |
| 8,247,467 B2 | 8/2012 | Mijolovic et al. |
| 8,293,808 B2 | 10/2012 | Herrington et al. |
| 8,349,907 B2 | 1/2013 | Henning et al. |
| 8,420,748 B2 | 4/2013 | Henning et al. |
| 8,623,984 B2 | 1/2014 | Henning et al. |
| 8,729,207 B2 | 5/2014 | Hartung et al. |
| 8,802,744 B2 | 8/2014 | Knott et al. |
| 8,906,974 B2 | 12/2014 | Glos et al. |
| 8,912,277 B2 | 12/2014 | Glos |
| 8,946,310 B2 | 2/2015 | Glos et al. |
| 8,946,369 B2 | 2/2015 | Henning et al. |
| 8,957,121 B2 | 2/2015 | Schiller et al. |
| 9,035,011 B2 | 5/2015 | Ferenz et al. |

(Continued)

FOREIGN PATENT DOCUMENTS

| | | |
|---|---|---|
| CN | 101880452 | 11/2010 |
| CN | 101880453 | 11/2010 |

(Continued)

OTHER PUBLICATIONS

JP2003-55424 machine translation (Year: 2024).*
European Search Report dated Jul. 10, 2019, in European Application No. 19150465.3, 8 pages.
Gao et al., Effects of raw and poly(propylene oxide) grafted nanosilica on the morphology and thermal and mechanical properties of polyurethane foam, copyright 2015, J. Appl. Polym. Sci., May 14, 2015, pp. 42400:1-10.

(Continued)

*Primary Examiner* — Jeffrey S Lenihan

(74) *Attorney, Agent, or Firm* — Grüneberg and Myers PLLC

(57) ABSTRACT

What are described are (a) a composition suitable for production of rigid polyurethane foam, comprising at least one isocyanate component, a polyol component, optionally a catalyst that catalyses the formation of a urethane or isocyanurate bond, optionally blowing agents, where the composition additionally comprises polyalkylsiloxane (PAS) containing no polyether modification, and polyether-modified siloxane, (b) a process for producing rigid polyurethane foam using polyalkylsiloxanes and polyether-modified siloxane, (c) the rigid polyurethane foam Thus obtainable and (d) the use thereof.

19 Claims, No Drawings

(56) References Cited

U.S. PATENT DOCUMENTS

| | | |
|---|---|---|
| 9,212,195 B1 | 12/2015 | Dyballa et al. |
| 9,221,850 B2 | 12/2015 | Dyballa et al. |
| 9,221,851 B2 | 12/2015 | Dyballa et al. |
| 9,290,604 B2 | 3/2016 | Andrew et al. |
| 9,334,354 B2 | 5/2016 | Ferenz et al. |
| 9,540,500 B2 | 1/2017 | Ferenz et al. |
| 9,657,144 B2 | 5/2017 | Hubel et al. |
| 9,682,898 B2 | 6/2017 | Peitz et al. |
| 9,737,884 B2 | 8/2017 | Dyballa et al. |
| 9,751,904 B2 | 9/2017 | Dyballa et al. |
| 9,840,524 B2 | 12/2017 | Dyballa et al. |
| 9,914,681 B2 | 3/2018 | Geilen et al. |
| 10,023,679 B2 | 7/2018 | Klostermann et al. |
| 10,351,687 B2 | 7/2019 | Diendorf et al. |
| 10,870,723 B2 | 12/2020 | Glos |
| 10,961,418 B2 | 3/2021 | Kolb et al. |
| 2002/0103091 A1 | 8/2002 | Kodali |
| 2005/0131090 A1 | 6/2005 | Furlan et al. |
| 2006/0155090 A1 | 7/2006 | Ferenz |
| 2006/0167125 A1 | 7/2006 | Bauer et al. |
| 2006/0229375 A1 | 10/2006 | Hsiao et al. |
| 2006/0293400 A1 | 12/2006 | Wiltz et al. |
| 2007/0066697 A1 | 3/2007 | Gilder et al. |
| 2007/0072951 A1 | 3/2007 | Bender et al. |
| 2007/0078193 A1 | 4/2007 | Gilder et al. |
| 2007/0270518 A1 | 11/2007 | Nutzel |
| 2008/0125503 A1 | 5/2008 | Henning et al. |
| 2009/0088488 A1 | 4/2009 | Bruckner et al. |
| 2011/0062370 A1 | 3/2011 | Eilbracht et al. |
| 2011/0218259 A1 | 9/2011 | Eling et al. |
| 2011/0306694 A1 | 12/2011 | Glos et al. |
| 2012/0153210 A1 | 6/2012 | Glos et al. |
| 2012/0264843 A1 | 10/2012 | Glos |
| 2013/0035407 A1 | 2/2013 | Lobert et al. |
| 2013/0338324 A1 | 12/2013 | Beierlein et al. |
| 2013/0345318 A1 | 12/2013 | Schubert et al. |
| 2015/0057384 A1 | 2/2015 | Glos et al. |
| 2016/0075846 A1 | 3/2016 | Krebs et al. |
| 2016/0096939 A1 | 4/2016 | Glos et al. |
| 2016/0152739 A1 | 6/2016 | Eilbracht et al. |
| 2016/0326330 A1 | 11/2016 | Schuette et al. |
| 2018/0016392 A1 | 1/2018 | Lobert et al. |
| 2018/0186924 A1 | 7/2018 | Giesker et al. |
| 2018/0327563 A1 | 11/2018 | Klostermann et al. |
| 2019/0233571 A1 | 8/2019 | Diendorf et al. |
| 2019/0233646 A1 | 8/2019 | Inagaki et al. |
| 2020/0239621 A1 | 7/2020 | Glos |
| 2020/0377669 A1 | 12/2020 | Knott et al. |
| 2020/0377684 A1 | 12/2020 | Hermann et al. |
| 2021/0047471 A1 | 2/2021 | Chen et al. |
| 2022/0017717 A1 | 1/2022 | Chaffanjon et al. |
| 2022/0041829 A1 | 2/2022 | Glos et al. |

FOREIGN PATENT DOCUMENTS

| | | |
|---|---|---|
| CN | 103044687 | 4/2013 |
| CN | 103055759 | 4/2013 |
| CN | 103657518 | 3/2014 |
| CN | 103665385 | 3/2014 |
| CN | 107922740 A | 4/2018 |
| DE | 2 533 074 A1 | 3/1976 |
| DE | 3 215 317 C1 | 6/1983 |
| DE | 3234462 C1 | 1/1984 |
| DE | 44 11 161 | 10/1994 |
| DE | 4 444 898 C1 | 10/1996 |
| DE | 10 2008 007 081 | 8/2009 |
| DE | 10 2013 212 481 | 12/2014 |
| EP | 0 258 600 A2 | 3/1988 |
| EP | 0 275 563 A1 | 7/1988 |
| EP | 0 421 269 | 4/1991 |
| EP | 0 533 202 A1 | 3/1993 |
| EP | 0 570 174 B1 | 11/1993 |
| EP | 0 704 468 | 4/1996 |
| EP | 0 739 932 | 10/1996 |
| EP | 0 867 464 A1 | 9/1998 |
| EP | 0 867 465 A1 | 9/1998 |
| EP | 0 045 B1 | 11/1998 |
| EP | 1 095 968 A1 | 5/2001 |
| EP | 1 161 474 A1 | 12/2001 |
| EP | 1 211 279 A1 | 6/2002 |
| EP | 1 520 870 A1 | 4/2005 |
| EP | 1 544 235 A1 | 6/2005 |
| EP | 1 678 232 A2 | 7/2006 |
| EP | 1 712 578 A1 | 10/2006 |
| EP | 1 873 209 A2 | 1/2008 |
| EP | 1 515 934 | 10/2008 |
| EP | 2 368 927 A1 | 9/2011 |
| EP | 2 465 891 A1 | 6/2012 |
| EP | 2 465 892 | 6/2012 |
| EP | 2 465 892 A1 | 6/2012 |
| EP | 2 492 292 | 8/2012 |
| EP | 2 947 064 | 11/2015 |
| EP | 3 115 389 | 1/2017 |
| EP | 3 243 863 A1 | 11/2017 |
| JP | S57-212219 | 12/1982 |
| JP | H04-18431 | 1/1992 |
| JP | H05-255468 | 10/1993 |
| JP | H08-156143 | 6/1996 |
| JP | H09-165427 | 6/1997 |
| JP | H09-165428 | 6/1997 |
| JP | 2001-040054 | 2/2001 |
| JP | 2001-040055 | 2/2001 |
| JP | 2002-003565 | 1/2002 |
| JP | 2003-055424 | 2/2003 |
| JP | 2004-315579 | 11/2004 |
| JP | 2004-315580 | 11/2004 |
| JP | 2005-171102 | 6/2005 |
| JP | 2005-344079 | 12/2005 |
| JP | 2006-241312 | 9/2006 |
| JP | 2010180369 A * | 8/2010 |
| JP | 2012-1574 | 1/2012 |
| KR | 2013-0007896 | 1/2013 |
| WO | 00/47647 A1 | 8/2000 |
| WO | 00/58383 A1 | 10/2000 |
| WO | 2004/020497 A1 | 3/2004 |
| WO | 2004/096882 A1 | 11/2004 |
| WO | 2005/033167 A2 | 4/2005 |
| WO | 2005/085310 A2 | 9/2005 |
| WO | 2006/094227 A2 | 9/2006 |
| WO | 2006/116456 A1 | 11/2006 |
| WO | 2008/058913 A1 | 5/2008 |
| WO | 2009/058367 A1 | 5/2009 |
| WO | 2009/130470 A1 | 10/2009 |
| WO | 2010/028362 A1 | 3/2010 |
| WO | 2010/111021 | 9/2010 |
| WO | 2011/012390 A1 | 2/2011 |
| WO | 2011/163133 A1 | 12/2011 |
| WO | 2012/021675 | 2/2012 |
| WO | 2012/031868 | 3/2012 |
| WO | 2013/022932 A1 | 2/2013 |
| WO | 2013/156237 | 10/2013 |
| WO | 2015/028295 A1 | 3/2015 |
| WO | 2015/101497 | 7/2015 |
| WO | 2015/101497 A1 | 7/2015 |
| WO | 2016/202912 | 12/2016 |
| WO | 2017/220332 | 12/2017 |
| WO | 2017/220332 A1 | 12/2017 |
| WO | 2020/076539 A1 | 4/2020 |
| WO | 2020/106538 | 5/2020 |
| WO | 2021/069164 A1 | 4/2021 |
| WO | 2021/165149 A1 | 8/2021 |
| WO | 2021/212317 A1 | 10/2021 |

OTHER PUBLICATIONS

International Search Report mailed on Feb. 27, 2020, in PCT/EP2019/085264, with English translation 7 pages.

Liang et al., "Preparation and Characterization of Thermoregulated Rigid Polyurethane Foams Containing Nanoencapsulated Phase Change Materials," copyright 2016, Ind. Eng. Chem. Res., vol. 55, Feb. 23, 2016, pp. 2721-2370.

Written Opinion dated Feb. 27, 2020, in PCT/EP2019/085264, with English translation, 14 pages.

(56) References Cited

OTHER PUBLICATIONS

Glos et al., U.S. Appl. No. 17/414,726, filed Jun. 16, 2021.
Wagner et al., U.S. Appl. No. 17/239,087, filed Apr. 23, 2021.
Wagner et al., U.S. Appl. No. 17/391,644, filed Aug. 2, 2021.
International Preliminary Report on Patentability received for PCT Application No. PCT/US2019/061387, mailed on Jun. 3, 2021, 10 pages.
International Search Report received for PCT Application No. PCT/US2019/061387, mailed on Feb. 28, 2020, 4 pages.
Written Opinion received for PCT Application No. PCT/US2019/061387, mailed on Feb. 28, 2020, 8 pages.
English International Search Report mailed on Apr. 2, 2020 in PCT/EP2019/085263 (3 pages).
European Search Report mailed on Jul. 10, 2019 in EP 19150460.4 (8 pages).
German International Search Report mailed on Apr. 2, 2020 in PCT/EP2019/085263 (4 pages).
German Written Opinion mailed on Apr. 2, 2020 in PCT/EP2019/085263 (8 pages).
European Search Report mailed on Jul. 10, 2019, in European Application No. 19150460.4, 8 pages.
Written Opinion mailed on Apr. 2, 2020, in PCT/EP2019/085263, with English translation, 15 pages.
U.S. Office Action dated Apr. 8, 2024, in U.S. Appl. No. 17/414,726, 27 pages.
"Ergänzende Laborversuche", Feb. 1, 2024, 3 pages with English translation.
BASF SE, "Sicherheitsdatenblatt", Jan. 26, 2024, 39 pages with English translation.
Evonik Oxeno GmbH & Co. KG, "OXO OIL LS 13", Product Information, May 2023, pp. 1-2.
Fiche de données de sécurité, "Shell Ondina Oil 68", Jan. 12, 2006, 10 pages with English translation.
Lubricant Base Oils Product Stewardship Summary, "White mineral oil (petroleum) Product Stewardship Summary", Aug. 2013, 1 page.
Evonik Industries, "TEGOSTAB® B 1048", Jul. 2007, 1 page.
Safety Data Sheet, "Shell Ondina Oil 68", Jan. 15, 2016, 1 page.
Sasol, "PARAFOL 14 RSPO-MB", Product Information, Oct. 18, 2018, pp. 1-7.
Technical Data Sheet, "Shell Ondina Oil 68", Medicinal White Oils, 2021, 2 pages.
"C1012 Normal Paraffin", Technical Data Sheet, 2011, 1 page.
"Hydrocarbons-Physical Data", The Engineering Toolbox, 2 pages.
Office Action received for U.S. Appl. No. 17/414,726, mailed on Jul. 3, 2025, 16 pages.
U.S. Appl. No. 17/414,726, filed Jun. 16, 2021, Patent Publication No. 2022/0041829, Glos et al.

* cited by examiner

PRODUCTION OF RIGID POLYURETHANE FOAM

CROSS REFERENCE TO RELATED APPLICATIONS

This application is a 35 U.S.C. § 371 U.S. national phase entry of International Application No. PCT/EP2019/085263 having an international filing date of Dec. 16, 2019, which claims the benefit of European Application No. 19150460.4 filed Jan. 7, 2019, both of which are incorporated herein by reference in its entirety.

FIELD

The present invention is in the field of rigid polyurethane foams. More particularly, it relates to the production of rigid polyurethane foams using specific siloxane compounds, and additionally to the use of the foams which have been produced therewith.

BACKGROUND

Polyurethane (PU) in the context of the present invention is especially understood to mean a product obtainable by reaction of polyisocyanates and polyols, or compounds having isocyanate-reactive groups. Further functional groups in addition to the polyurethane can also be formed in the reaction, examples being uretdiones, carbodiimides, isocyanurates, allophanates, biurets, ureas and/or uretonimines. Therefore, PU is understood in the context of the present invention to mean both polyurethane and polyisocyanurate, polyureas, and polyisocyanate reaction products containing uretdione, carbodiimide, allophanate, biuret and uretonimine groups. In the context of the present invention, polyurethane foam (PU foam) is especially understood to mean foam which is obtained as reaction product based on polyisocyanates and polyols or compounds having isocyanate-reactive groups. The reaction to give what is named a polyurethane can form further functional groups as well, examples being allophanates, biurets, ureas, carbodiimides, uretdiones, isocyanurates or uretonimines.

Rigid polyurethane and polyisocyanurate foams are produced using cell-stabilizing additives to ensure a fine-celled, uniform and low-defect foam structure and hence to exert an essentially positive influence on the performance characteristics, particularly the thermal insulation performance, of the rigid foam. Surfactants based on polyether-modified siloxanes are particularly effective and therefore represent the preferred type of foam stabilizers.

Various publications relating to the use of siloxane-based additives have already been published. Usually, polyethersiloxane foam stabilizers (PES) are used here for rigid foam applications.

EP 0 570 174 B1 describes polyethersiloxanes suitable for the production of rigid polyurethane foams using organic blowing agents, particularly chlorofluorocarbons such as CFC-11.

EP 0 533 202 A1 describes polyethersiloxanes that bear SiC-bonded polyalkylene oxide radicals and are suitable as blowing agent in the case of use of hydrochlorofluorocarbons, for example HCFC-123.

EP 0 877 045 B1 describes analogous structures for this production process which differ from the former foam stabilizers in that they have a comparatively higher molecular weight and have a combination of two polyether substituents on the siloxane chain.

EP1544235 describes typical polyether-modified siloxanes for rigid PU foam applications. Siloxanes having 60 to 130 silicon atoms and different polyether substituents R, the mixed molar mass of which is 450 to 1000 g/mol and the ethylene oxide content of which is 70 to 100 mol %, are used here.

CN103055759 describes polyether-modified siloxanes that bring about improved cell opening. At least 18 silicon units are present in the siloxane, and various types of side chains are used for modification.

EP 1873209 describes polyether-modified siloxanes for production of rigid PU foams having improved fire properties. Here there are 10 to 45 silicon atoms in the siloxanes, and the polyether side chains consist to an extent of at least 90% of ethylene oxide units.

EP 2465891 A1 describes polyether-modified siloxanes in which some of the polyether side chains bear OH groups. The siloxanes here contain at least 10 silicon atoms.

EP 2465892 A1 describes polyether-modified siloxanes in which the polyether side chains bear mainly secondary OH end groups. Here too, the siloxanes contain at least 10 silicon atoms.

DE 3234462 describes siloxanes for use in flexible foam, especially moulded flexible foam. There are descriptions here of combinations of polyether-modified siloxanes (PES) and polydimethylsiloxanes, where the PES contain 4-15 silicon units. There is no description here of use in rigid foam.

Siloxanes that do not contain any polyether modification are known mainly as additives in flexible polyurethane foam, especially moulded foam.

Examples of these are DE 2533074 A1, which describes polydimethylsiloxane for flexible foam, having chain lengths up to N=12; EP1095968A1, which describes polydimethylsiloxanes for flexible foam having preferably 7-9 silicon atoms; DE4444898 C1, which describes the production of cold-cure foams with alkylaryl-modified siloxanes containing 5-16 silicon atoms. DE 3215317 C1 describes the production of cold-cure foams with siloxanes that have been modified with allyl glycidyl ether and then reacted with amines. Here too, not more than 10 silicon atoms are present in siloxanes. EP0258600A2 describes cold-cure foams with chloropropyl-modified siloxanes having 3-20 silicon units and 1-8 side chain modifications.

However, none of these documents describes use in rigid PU foam.

EP2368927A1 describes the production of rigid PU foam using $CO_2$ as blowing agent and two different polyol types, one based on phenolic resins, prepared from novolaks and alkylene oxides, and one based on aromatic amine polyols, prepared by alkoxylation of aromatic amines. As well as customary PES, it is also possible here to use polydimethylsiloxanes, such as hexamethyldisiloxane in particular.

SUMMARY

The problem addressed by the present invention was that of providing rigid polyurethane or polyisocyanurate foams that have particularly advantageous use properties, such as, in particular, low thermal conductivity and/or good surface quality.

DETAILED DESCRIPTION

It has now been found that, surprisingly, the combined use of polyalkylsiloxanes (PAS) containing no polyether modification, and polyether-modified siloxanes (PES) enables the solution of this problem, as it leads to the production of rigid foams having improved use properties (such as, in particular, lambda values). More particularly, low thermal conductivity and/or good surface quality are enabled. A good fine-cell content is enabled. Foam defects can be reduced.

With the inventive additives, it is thus possible to produce rigid PU foam-based products, for example insulation panels or cooling units, with higher quality or to make the processes for production more efficient.

Even a very small addition of inventive polyalkylsiloxanes, in interplay with polyether-modified siloxanes, enables corresponding improvements. The polyalkylsiloxanes according to the invention do not contain any polyether modification.

In a preferred embodiment of the invention, the inventive polyalkylsiloxanes contain fewer than 20, preferably fewer than 15 and more preferably fewer than 11 silicon atoms.

In a preferred embodiment of the invention, the inventive polyalkylsiloxanes are used in combination with polyether-modified siloxanes in a mass ratio of 1:5 to 1:200.

Polyether-modified siloxanes used may be the known structures according to the prior art that are suitable for production of rigid PU foams. These are known to those skilled in the art.

In a preferred embodiment of the invention, the inventive polyalkylsiloxanes and polyether-modified siloxanes may be added separately or as a mixture to the compound to be foamed.

When the inventive polyalkylsiloxanes are added separately, they are preferably added in a carrier medium (solvent). Examples of useful carrier media include glycols, alkoxylates or oils of synthetic and/or natural origin.

In a preferred embodiment of the invention, the inventive polyalkylsiloxanes conform to the formula (1):

$$M_a D_b T_c Q_d \quad \text{(Formula 1)}$$

$M=R^{11}R^{12}R^{13}SiO_{1/2}$
$D=R^{14}R^{15}SiO_{2/2}$
$T=R^{16}SiO_{3/2}$
$Q=SiO_{4/2}$
$R^{11}$, $R^{12}$, $R^{13}$, $R^{14}$, $R^{15}$, $R^{16}$=identical or different hydrocarbon radicals having 1 to 12 carbon atoms, where the hydrocarbon radicals are optionally substituted by heteroatoms, excluding oxygen, or H,
preferably identical or different hydrocarbon radicals having 1-8 carbon atoms, where the hydrocarbon radicals are optionally substituted by heteroatoms, excluding oxygen, or H, especially preferably the radicals: phenyl-, $CH_3$—, $CH_3CH_2$—, $CH_2CH$— $ClCH_2CH_2CH_2$— and H—.
a=2-6
b=0-8
c=0-b 4
d=0-2
with the proviso that a+b+c+d<20, preferably <15, especially preferably <11.

Preferably, c+d>0.5; especially preferably, c+d>=1.

In a further particularly preferred execution, d=0 and c>0.5; in particular, d=0 and c is not less than 1.

In a further preferred execution, c+d<0.5; especially preferably, c+d<0.1.

In a further preferred execution, $R^{16}$ is different from $R^{11}$, $R^{12}$, $R^{13}$, $R^{14}$ and $R^{15}$.

In a further preferred execution, $R^{11}$, $R^{12}$, $R^{13}$ are different, and so the M unit in the siloxane bears two or three different radicals.

Preferred polyalkylsiloxanes conform to the formula 2:

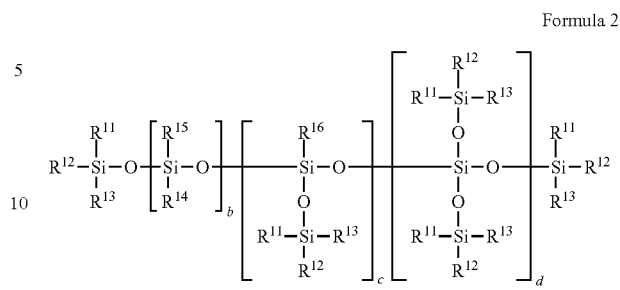

Formula 2 in which $R^{11}$ to $R^{16}$ and b, c, d are as specified above.

Preferred polyalkylsiloxanes of the formula 2 conform to the formula 3 or 4:

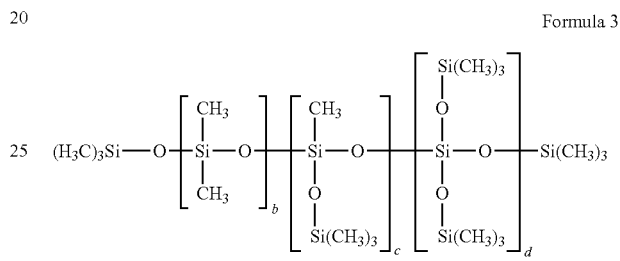

Formula 3

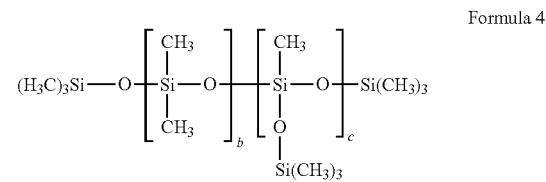

Formula 4 in which b, c, d are as specified above.

Preferred polyalkylsiloxanes are as follows:

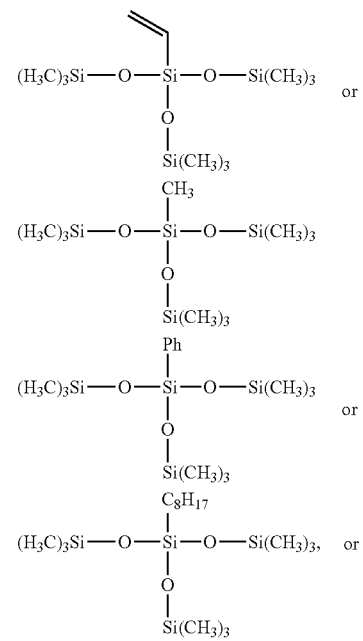

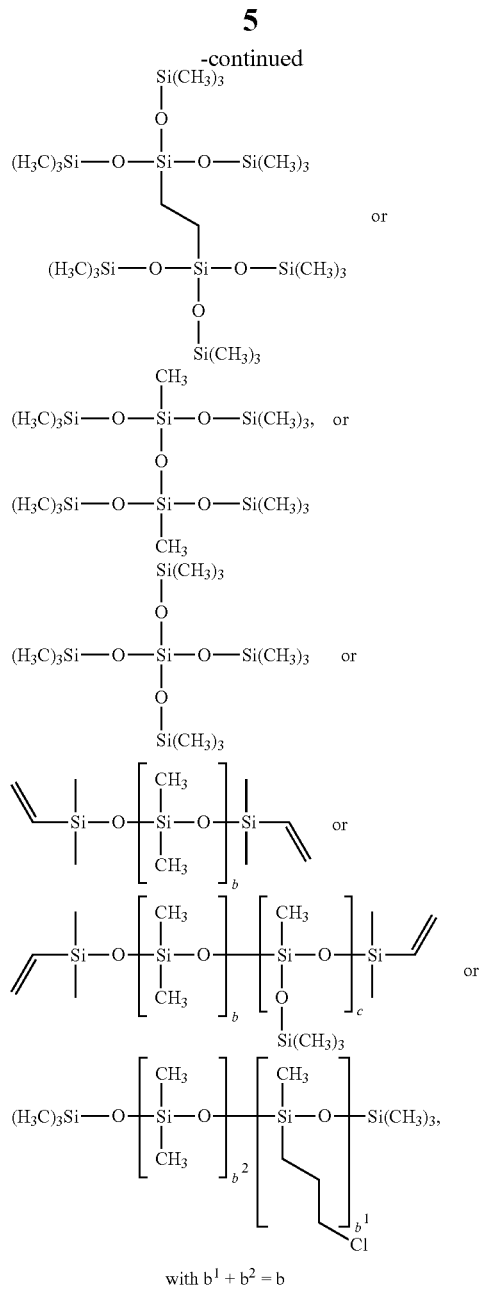
where b, c are as specified above,
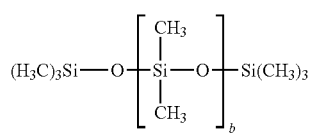
where b is as specified above, or
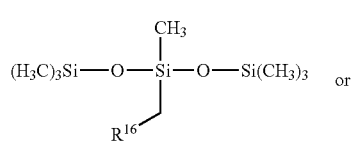
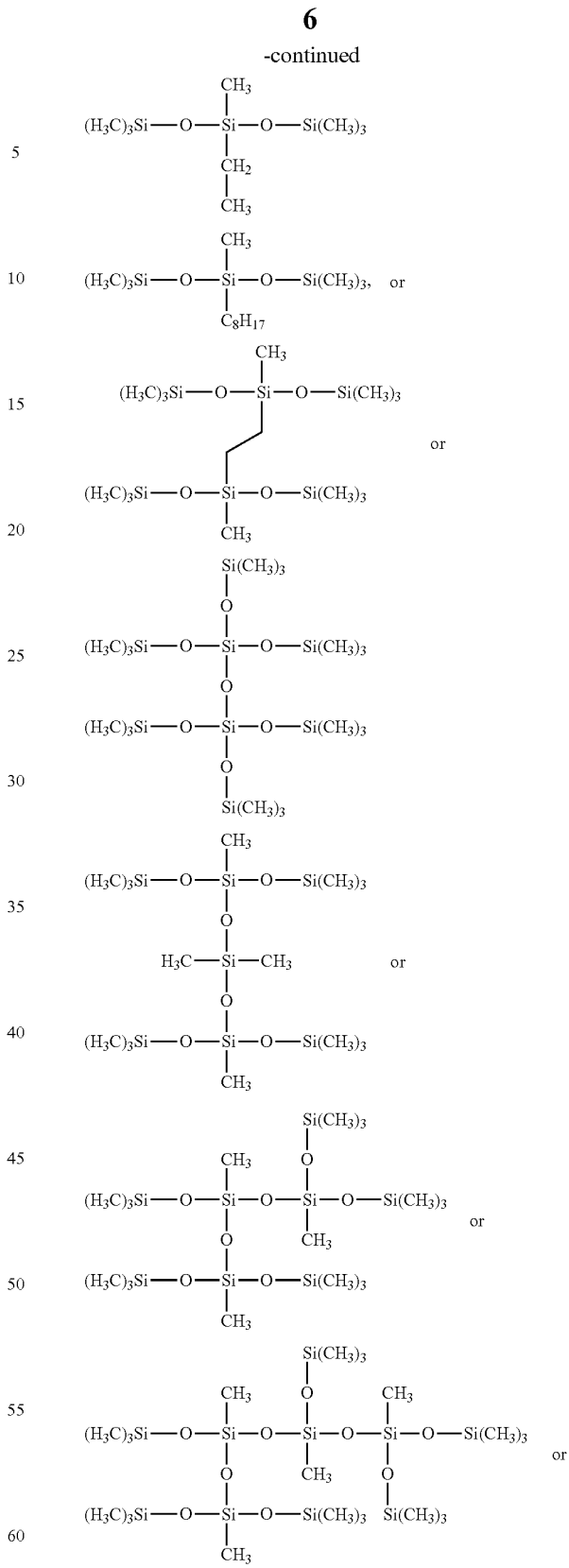

-continued

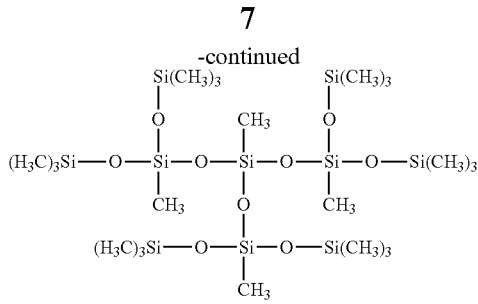

The polyether-modified siloxanes are described more specifically hereinafter.

In principle, it is possible to use any polyether-modified siloxanes known from the prior art.

Preferred polyether-modified siloxanes can be described by the following formula:

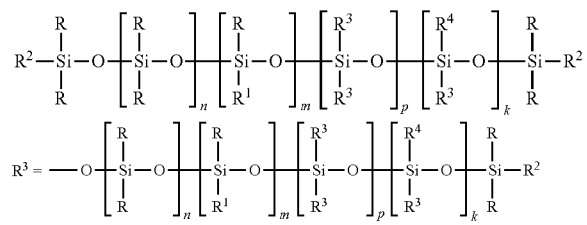

where n is independently 0 to 500, preferably 1 to 300 and especially 2 to 150, m is independently 0 to 60, preferably 1 to 50 and especially 1 to 30, p is independently 0 to 10, preferably 0 or >0 to 5, k is independently 0 to 10, preferably 0 or >0 to 5, with the proviso that, for each molecule of the formula (1), the average number Σk of T units and the average number Σp of Q units per molecule is not greater than 50 in either case, the average number Σn of D units per molecule is not greater than 2000 and the average number Σm of the siloxy units bearing $R^1$ per molecule is not greater than 100, R is independently at least one radical from the group of linear, cyclic or branched, aliphatic or aromatic, saturated or unsaturated hydrocarbon radicals having 1 up to 20 carbon atoms, but is preferably a methyl radical, $R^2$ is independently $R^1$ or R, $R^1$ is different from R and is independently an organic radical and/or a polyether radical, $R^1$ is preferably selected from the group of

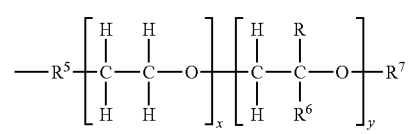

—$CH_2$—$CH_2$—$CH_2$—O—($CH_2$—$CH_2$O—)$_x$—($CH_2$—CH($R^6$)O—)$_y$—$R^7$

—$CH_2$—$CH_2$—O—($CH_2$—$CH_2$O—)$_x$—($CH_2$—CH($R^6$)O—)$_y$—$R^7$

—O—($C_2H_4$O—)$_x$—($C_3H_5$O—)$_y$-$R^6$

—$CH_2$—$R^8$

—$CH_2$—$CH_2$—(O)$_{x'}$—$R^8$

—$CH_2$—$CH_2$—$CH_2$—O—$CH_2$—CH(OH)—$CH_2$OH

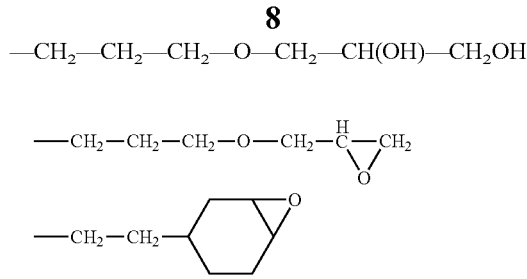

—$CH_2$—$CH_2$—$CH_2$—O—$CH_2$—C($CH_2$OH)$_2$—$CH_2$—$CH_3$, in which x=0 to 100, preferably >0, especially 1 to 50, x'=0 or 1, y=0 to 100, preferably >0, especially 1 to 50, $R^6$ is independently an optionally substituted alkyl or aryl group having 1 to 12 carbon atoms, substituted, for example, by alkyl radicals, aryl radicals or haloalkyl or haloaryl radicals, where different substituents $R^6$ may be present within any $R^1$ radical and/or any molecule of the formula (1), and $R^7$ is independently a hydrogen radical or an alkyl group having 1 to 4 carbon atoms, a C(O)—$R^8$ group with $R^8$=alkyl radical, a —$CH_2$—O—$R^6$ group, an alkylaryl group, for example a benzyl group, or a —C(O)NH—$R^6$ group, $R^8$ is a linear, cyclic or branched, optionally substituted, e.g. halogen-substituted, hydrocarbon radical having 1 to 50, preferably 9 to 45, more preferably 13 to 37, carbon atoms, is $DG_z$ where D is a linear, cyclic or branched, optionally substituted, e.g. substituted by heteroatoms such as O, N or halogens, saturated or unsaturated hydrocarbon radical having from 2 to 50, preferably from 3 to 45, more preferably from 4 to 37, carbon atoms, G corresponds to one of the following formulae

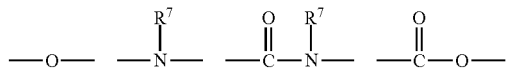

z can be 0 or 1, where $R^1$ may also be bridging in the sense that two or three siloxane structures of the formula (1) may be joined via $R^1$, in which case $R^7$ or $R^8$ are correspondingly bifunctional groups, i.e. $R^5$, $R^4$ may independently be R, $R^1$ and/or a functionalized, organic, saturated or unsaturated radical having substitution by heteroatoms, selected from the group of the alkyl, aryl, chloroalkyl, chloroaryl, fluoroalkyl, cyanoalkyl, acryloyloxyaryl, acryloyloxyalkyl, methacryloyloxyalkyl, methacryloyloxypropyl and vinyl radical, with the proviso that at least one substituent from $R^1$, $R^2$ and $R^4$ is not R.

$R^3$ represents the siloxane side chains which can be formed by T and Q units. Since it is not possible to control precisely where these branching points are located, $R^3$ once again occurs for $R^3$ in the formula (1). It is thus possible to obtain hyperbranched structures as in the case of, for example, dendrimers.

Particularly preferred polyether-modified siloxanes conform to the formula 5

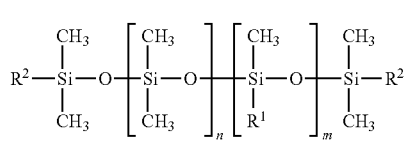

FORMULA 5 where
$R^1$ is the same or different and is

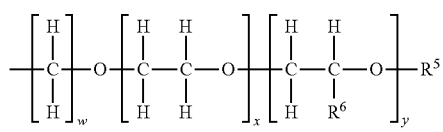

or a $C_8$ to $C_{22}$-alkyl radical,
$R^2$ is the same or different and is $—CH_3$ or $R^1$,
$n+m+=10$ to 150, preferably 25 to 120,
$m=0$ to 25, preferably 0.5 to 15,
$w=2$ to 10, preferably 3,
$x+y=1$ to 30, preferably 5 to 25,
$R^6$ is the same or different and is $—CH_3$, $—CH_2CH_3$ or phenyl radicals,
$R^5$ is the same or different and is H, alkyl or acyl radicals, preferably $—H$, $—CH_3$ or $—COCH_3$,
where at least one radical with $x+y$ greater than 3 must be present.

In a preferred embodiment, at least one $R^2$ radical is the same as $R^1$.

In a further preferred embodiment of the invention, polyether-modified siloxanes of the formula 5 are used, where the molar proportion of oxyethylene units amounts to at least 70% of the oxyalkylene units, i.e. $x/(x+y)>0.7$. It may also be advantageous when the polyoxyalkylene chain bears a hydrogen or a methyl group at its end and, at the same time, the molar proportion of oxyethylene units accounts for not more than 70% of the oxyalkylene units, i.e. $x/(x+y)<0.7$, and $R^5$ is a hydrogen or methyl radical.

In a further preferred embodiment of the invention, polyethersiloxanes of the formula (5) that were hydrosilylated with inclusion of olefins are used, as a result of which $R^1$ consists to an extent of not less than 10 mol %, preferably to an extent of not less than 20 mol % and more preferably to an extent of not less than 40 mol % of $CH_2—R^8$ where $R^8$ is a linear or branched hydrocarbon having 9 to 17 carbon atoms.

In a further preferred embodiment of the invention, polyethersiloxanes of the formula (5) in which the terminal positions (also called the alpha and omega positions) on the siloxane are at least partly functionalized with $R^1$ moieties are used. In this case, at least 10 mol %, preferably at least 30 mol % and more preferably at least 50 mol % of the terminal positions are functionalized with $R^1$ radicals.

In a particularly preferred embodiment of the invention, polyethersiloxanes of the formula (5) in which a statistical average of not more than 50%, preferably not more than 45%, more preferably not more than 40%, of the total mean molar mass of the siloxane is accounted for by the cumulative molar mass of all the identical or different $R^1$ radicals in the siloxane are used.

In a further preferred embodiment of the invention, polyethersiloxanes of the formula (5) where the structural elements having the index n are present in a greater number than the structural elements having the index m, in such a way that the quotient n/m is at least equal to 4, preferably greater than 6, more preferably greater than 7, are used.

The inventive polyalkylsiloxanes and polyether-modified siloxanes may also be used as part of compositions with different carrier media. Examples of useful carrier media include glycols, alkoxylates or oils of synthetic and/or natural origin. In a preferred embodiment of the invention, the total proportion by mass of inventive polyalkylsiloxanes and polyether-modified siloxanes in the finished polyurethane foam is from 0.01% to 10% by weight, preferably from 0.1% to 3% by weight.

In a preferred embodiment of the invention, the following combinations of PAS and PES are used:
a) PAS of the formula 3 with $c+d>0.5$ in combination with PES of the formula 5 in which the quotient n/m is at least 4, preferably greater than 6, more preferably greater than 7,
b) PAS of the formula 3 with $c+d>0.5$ in combination with PES of the formula 5 in which a statistical average of not more than 50%, preferably not more than 45%, more preferably not more than 40%, of the total mean molar mass of the siloxane is accounted for by the cumulative molar mass of all the identical or different $R^1$ radicals in the siloxane,
c) PAS of the formula 3 with $c+d>0.5$ in combination with PES of the formula 5 in which the polyoxyalkylene chain bears a hydrogen or a methyl group at its end and, at the same time, the molar proportion of oxyethylene units accounts for not more than 70% of the oxyalkylene units, i.e. $x/(x+y)<0.7$, and $R^5$ is a hydrogen or methyl radical,
d) PAS of the formula 3 with $c+d<0.5$, especially preferably $c+d<0.1$, in combination with PES of the formula 5 in which the quotient n/m is at least 4, preferably greater than 6, more preferably greater than 7,
e) PAS of the formula 3 with $c+d<0.5$, especially preferably $c+d<0.1$, in combination with PES of the formula 5 in which a statistical average of not more than 50%, preferably not more than 45%, more preferably not more than 40%, of the total mean molar mass of the siloxane is accounted for by the cumulative molar mass of all the identical or different $R^1$ radicals in the siloxane, or
f) PAS of the formula 3 with $c+d<0.5$, especially preferably $c+d<0.1$, in combination with PES of the formula 5 in which the polyoxyalkylene chain bears a hydrogen or a methyl group at its end and, at the same time, the molar proportion of oxyethylene units accounts for not more than 70% of the oxyalkylene units, i.e. $x/(x+y)<0.7$, and $R^5$ is a hydrogen or methyl radical.

The inventive combinations of polyalkylsiloxanes and polyether-modified siloxanes are also referred to hereinafter as "mixture", irrespective of whether the two components are supplied separately or together to the reaction mixture for production of the rigid PU foam.

The present invention further provides a composition suitable for production of rigid polyurethane or polyisocyanurate foams, comprising at least one isocyanate component, at least one polyol component, at least one foam stabilizer, at least one urethane and/or isocyanurate catalyst, water and/or blowing agent, and optionally at least one flame retardant and/or further additives, which is characterized in that an inventive mixture of polyalkylsiloxanes and polyether-modified siloxanes is present as foam stabilizer, a process for producing rigid polyurethane or polyisocyanurate foams by reacting this composition, and also the rigid polyurethane or polyisocyanurate foams obtainable thereby.

The present invention additionally provides for the use of rigid polyurethane or polyisocyanurate foams according to the invention as insulation boards and insulant, and also a cooling apparatus which includes a rigid polyurethane or polyisocyanurate foam according to the invention as insulating material.

The inventive mixture of polyalkylsiloxanes and polyether-modified siloxanes has the advantage of producing rigid polyurethane or polyisocyanurate foams, which are marked by a good fine-cell content and good insulating properties and at the same time have little by way of foam defects.

Preferred compositions according to the invention that are suitable for production of rigid polyurethane or polyisocyanurate foams contain at least one isocyanate component, at least one polyol component, at least one foam stabilizer, at least one urethane and/or isocyanurate catalyst, water and/or blowing agent, and optionally at least one flame retardant and/or further additives, and are notable in that at least one inventive mixture of polyalkylsiloxanes and polyether-modified siloxanes is present.

A preferred composition of the invention contains the following constituents:
 a) at least one isocyanate-reactive component, especially polyols
 b) at least one polyisocyanate and/or polyisocyanate prepolymer
 c) (optionally) a catalyst which accelerates or controls the reaction of polyols a) and b) with the isocyanates c)
 d) an inventive mixture of polyalkylsiloxanes and polyether-modified siloxanes
 e) one or more blowing agents
 f) further additives, fillers, flame retardants, etc.

In the composition according to the invention, the proportion by mass of inventive siloxane mixture (i.e. polyalkylsiloxanes and polyether-modified siloxanes) d), based on 100 parts by mass of polyol component a), is preferably from 0.1 to 10 pphp, more preferably from 0.5 to 5 pphp and especially preferably from 1 to 3 pphp.

Polyols suitable as polyol component a) for the purposes of the present invention are all organic substances having one or more isocyanate-reactive groups, preferably OH groups, and also formulations thereof. Preferred polyols are all polyether polyols and/or polyester polyols and/or hydroxyl-containing aliphatic polycarbonates, especially polyether polycarbonate polyols, and/or polyols of natural origin, known as "natural oil-based polyols" (NOPs) which are customarily used for producing polyurethane systems, especially polyurethane coatings, polyurethane elastomers or foams. The polyols usually have a functionality of from 1.8 to 8 and number-average molecular weights in the range from 500 to 15 000. The polyols having OH numbers in the range from 10 to 1200 mg KOH/g are usually employed.

Polyether polyols can be prepared by known methods, for example by anionic polymerization of alkylene oxides in the presence of alkali metal hydroxides, alkali metal alkoxides or amines as catalysts and by addition of at least one starter molecule which preferably contains 2 or 3 reactive hydrogen atoms in bonded form, or by cationic polymerization of alkylene oxides in the presence of Lewis acids, for example antimony pentachloride or boron trifluoride etherate, or by double metal cyanide catalysis. Suitable alkylene oxides contain from 2 to 4 carbon atoms in the alkylene moiety. Examples are tetrahydrofuran, 1,3-propylene oxide, 1,2-butylene oxide and 2,3-butylene oxide; ethylene oxide and 1,2-propylene oxide are preferably used. The alkylene oxides can be used individually, cumulatively, in blocks, in alternation or as mixtures. Starter molecules used may especially be compounds having at least 2, preferably 2 to 8, hydroxyl groups, or having at least two primary amino groups in the molecule. Starter molecules used may, for example, be water, di-, tri- or tetrahydric alcohols such as ethylene glycol, propane-1,2- and -1,3-diol, diethylene glycol, dipropylene glycol, glycerol, trimethylolpropane, pentaerythritol, castor oil, etc., higher polyfunctional polyols, especially sugar compounds, for example glucose, sorbitol, mannitol and sucrose, polyhydric phenols, resols, for example oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule is dependent on the respective field of application of the resulting polyether polyol in the production of polyurethane.

Polyester polyols are based on esters of polybasic aliphatic or aromatic carboxylic acids, preferably having 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having 2 to 12, more preferably having 2 to 6, carbon atoms, preferably trimethylolpropane and glycerol.

In a particularly preferred embodiment, polyester polyols based on aromatic carboxylic acids are used at more than 50 pphp, preferably more than 70 pphp, based on 100 parts by mass of polyol component.

In a further particularly preferred embodiment, no polyols based on phenolic resins prepared from novolaks and alkylene oxides and no polyols based on aromatic amine polyols prepared by alkoxylation of aromatic amines are used, which means that, in this preferred embodiment, less than 20 pphp, preferably less than 10 pphp, especially less than 2 pphp and most advantageously no polyols at all based on phenolic resins prepared from novolaks and alkylene oxides and no polyols at all based on aromatic amine polyols prepared by alkoxylation of aromatic amines are used.

Polyether polycarbonate polyols are polyols containing carbon dioxide in the bonded form of the carbonate. Since carbon dioxide forms as a by-product in large volumes in many processes in the chemical industry, the use of carbon dioxide as comonomer in alkylene oxide polymerizations is of particular interest from a commercial point of view. Partial replacement of alkylene oxides in polyols with carbon dioxide has the potential to distinctly lower the costs for the production of polyols. Moreover, the use of CO2 as comonomer is very advantageous in environmental terms, since this reaction constitutes the conversion of a greenhouse gas to a polymer. The preparation of polyether polycarbonate polyols by addition of alkylene oxides and carbon dioxide onto H-functional starter substances by use of catalysts is well known. Various catalyst systems can be used here: The first generation was that of heterogeneous zinc or aluminium salts, as described, for example, in U.S. Pat. No. 3,900,424 or U.S. Pat. No. 3,953,383. In addition, mono- and binuclear metal complexes have been used successfully for copolymerization of CO2 and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols based on renewable raw materials, natural oil-based polyols (NOPs), for production of polyurethane foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of these polyols are now available on the market from various manufacturers (WO2004/020497, US2006/0229375, WO2009/058367). Depending on the base raw material (e.g. soya bean oil, palm oil or castor oil) and the subsequent workup, polyols having a different profile of properties are the result. It is possible here to distinguish essentially between two groups: a) polyols based on renewable raw materials which are modified such that they can be used to an extent of 100% for production of polyurethanes (WO2004/020497, US2006/0229375); b) polyols based on renewable raw materials which, because of the processing and properties thereof, can replace the petrochemical-based polyol only in a certain proportion (WO2009/058367).

A further class of usable polyols is that of the so-called filled polyols (polymer polyols). A feature of these is that they contain dispersed solid organic fillers up to a solids content of 40% or more. SAN, PUD and PIPA polyols are among useful polyols. SAN polyols are highly reactive polyols containing a dispersed copolymer based on styreneacrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

A further class of useful polyols are those which are obtained as prepolymers via reaction of polyol with isocyanate in a molar ratio of preferably 100:1 to 5:1, more preferably 50:1 to 10:1. Such prepolymers are preferably made up in the form of a solution in polymer, and the polyol preferably corresponds to the polyol used for preparing the prepolymers.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000 and preferably in the range from 40 to 600. An index of 100 represents a molar reactive group ratio of 1:1.

In a preferred embodiment of the invention, the index of the formulation is in the range of 150 to 550, more preferably 200 to 500. This means that a distinct excess of isocyanate groups over isocyanate-reactive groups is present. This results in trimerization reactions of the isocyanates, which thus form isocyanurates. These foam types are also referred to as polyisocyanurate (PIR) foams and are notable for improved fire characteristics, i.e. poorer burning.

Isocyanate components b) used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Isocyanates are more preferably used in a range of from 60 to 200 mol %, relative to the sum total of isocyanate-consuming components.

Specific examples here are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, naphthalene diisocyanate, diethyltoluene diisocyanate, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates can be used individually or in the form of mixtures thereof. It is likewise possible to use corresponding "oligomers" of the diisocyanates (IPDI trimer based on isocyanurate, biurets, uretdiones). In addition, the use of prepolymers based on the abovementioned isocyanates is possible.

It is also possible to use isocyanates which have been modified by the incorporation of urethane, uretdione, isocyanurate, allophanate and other groups, called modified isocyanates.

Particularly suitable organic polyisocyanates which are therefore used with particular preference are various isomers of tolylene diisocyanate (tolylene 2,4- and 2,6-diisocyanate (TDI), in pure form or as isomer mixtures of various composition), diphenylmethane 4,4'-diisocyanate (MDI), "crude MDI" or "polymeric MDI" (contains the 4,4' isomer and also the 2,4' and 2,2' isomers of MDI and products having more than two rings) and also the two-ring product which is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Suitable catalysts c) in the context of the present invention are all compounds which are able to accelerate the reaction of isocyanates with OH functions, NH functions or other isocyanate-reactive groups and with isocyanates themselves. It is possible here to make use of the customary catalysts known from the prior art, including, for example, amines (cyclic, acyclic; monoamines, diamines, oligomers having one or more amino groups), ammonium compounds, organometallic compounds and metal salts, preferably those of tin, iron, bismuth and zinc. In particular, it is possible to use mixtures of a plurality of components as catalysts.

As component d) the mixtures of siloxanes according to the invention (i.e. polyalkylsiloxanes and polyether-modified siloxanes) are used.

The use of polyether-modified siloxanes (PES) in rigid foams is known. In the context of this invention, it is possible here to use any of those that promote foam production (stabilization, cell regulation, cell opening, etc.). These compounds are sufficiently well known from the prior art.

Corresponding PES usable in the context of this invention are described, for example, in the following patent specifications:

CN 103665385, CN 103657518, CN 103055759, CN 103044687, US 2008/0125503, US 2015/0057384, EP 1520870 A1, EP 1211279, EP 0867464, EP 0867465, EP 0275563. The aforementioned documents are hereby incorporated by reference and are considered to form part of the disclosure-content of the present invention.

The polyalkylsiloxanes (PAS) and polyether-modified siloxanes (PES) that are used with preference in accordance with the invention have already been described above.

In a further preferred embodiment, the total amount of the siloxanes used is such that the proportion by mass based on the finished polyurethane is 0.01% to 10% by weight, preferably 0.1% to 3% by weight.

The use of blowing agents e) is optional, depending on which foaming process is used. It is possible to work with chemical and physical blowing agents. The selection of the blowing agent depends greatly here on the type of system.

According to the amount of blowing agent used, a foam having high or low density is produced. For instance, foams having densities of 5 kg/m$^3$ to 900 kg/m$^3$ can be produced. Preferred densities are 8 to 800, more preferably 10 to 600 kg/m$^3$, especially 30 to 150 kg/m$^3$.

Physical blowing agents used may be corresponding compounds having appropriate boiling points. It is likewise possible to use chemical blowing agents which react with NCO groups to liberate gases, for example water or formic acid. Examples of blowing agents include liquefied CO2, nitrogen, air, volatile liquids, for example hydrocarbons having 3, 4 or 5 carbon atoms, preferably cyclopentane, isopentane and n-pentane, hydrofluorocarbons, preferably HFC 245fa, HFC 134a and HFC 365mfc, chlorofluorocarbons, preferably HCFC 141b, hydrofluoroolefins (HFO) or hydrohaloolefins, for example 1234ze, 1234yf, 1233zd(E) or 1336mzz, oxygen compounds such as methyl formate, acetone and dimethoxymethane, or chlorinated hydrocarbons, preferably dichloromethane and 1,2-dichloroethane.

Suitable water contents for the purposes of this invention depend on whether or not one or more blowing agents are used in addition to the water. In the case of purely water-blown foams, preferred values are typically 1 to 20 pphp; when other blowing agents are used in addition, the preferred use amount is reduced to typically 0.1 to 5 pphp.

Additives f) used may be any substances which are known from the prior art and are used in the production of polyurethanes, especially polyurethane foams, for example crosslinkers and chain extenders, stabilizers against oxidative degradation (known as antioxidants), flame retardants, surfactants, biocides, cell-refining additives, cell openers, solid fillers, antistatic additives, nucleating agents, thickeners, dyes, pigments, color pastes, fragrances, and emulsifiers, etc.

The process of the invention for producing PU foams can be conducted by the known methods, for example by manual mixing or preferably by means of foaming machines. If the process is carried out by using foaming machines, it is possible to use high-pressure or low-pressure machines. The process of the invention can be carried out either batchwise or continuously.

A preferred rigid polyurethane or polyisocyanurate foam formulation in the context of this invention gives a foam density of from 5 to 900 kg/m$^3$ and has the composition shown in Table 1.

TABLE 1

Composition of a preferred rigid polyurethane or polyisocyanurate formulation

| Component | Proportion by weight |
|---|---|
| Polyol | 0.1 to 100 |
| Amine catalyst | 0 to 5 |
| Metal catalyst | 0 to 10 |
| Polyalkylsiloxanes and polyether-modified siloxanes | 0.1 to 5 |
| Water | 0.01 to 20 |
| Blowing agent | 0 to 40 |
| Further additives (flame retardants, etc.) | 0 to 90 |
| Isocyanate index: 10 to 1000 | |

For further preferred embodiments and configurations of the process of the invention, reference is also made to the details already given above in connection with the composition of the invention.

The invention further provides a rigid PU foam obtainable by the process mentioned.

In a preferred embodiment of the invention, the rigid polyurethane foam has a density of 5 to 900 kg/m$^3$, preferably 8 to 800, especially preferably 10 to 600 kg/m$^3$, more particularly 30 to 150 kg/m$^3$.

Rigid polyurethane foam or rigid PU foam is an established technical term. The known and fundamental difference between flexible foam and rigid foam is that flexible foam shows elastic characteristics and hence deformation is reversible. By contrast, rigid foam is permanently deformed. In the context of the present invention, rigid polyurethane foam is especially understood to mean a foam to DIN 7726 that has a compressive strength to DIN 53 421/DIN EN ISO 604 of advantageously ≥20 kPa, preferably ≥80 kPa, more preferably >100 kPa, further preferably ≥150 kPa, especially preferably ≥180 kPa. In addition, the rigid polyurethane foam, according to DIN ISO 4590, advantageously has a closed-cell content of greater than 50%, preferably greater than 80% and more preferably greater than 90%.

The rigid PU foams according to the invention can be used as or for production of insulation materials, preferably insulation boards, refrigerators, insulating foams, roof liners, packaging foams or spray foams.

Particularly in the refrigerated warehouse, refrigeration appliances and domestic appliances industry, for example for production of insulating panels for roofs and walls, as insulating material in containers and warehouses for frozen goods, and for refrigeration and freezing appliances, the PU foams of the invention can be used advantageously.

Further preferred fields of use are in motor vehicle construction, especially for production of motor vehicle inner roof liners, bodywork parts, interior trim, cooled motor vehicles, large containers, transport pallets, packaging laminates, in the furniture industry, for example for furniture parts, doors, linings, in electronics applications.

Cooling apparatuses of the invention have, as insulation material, a rigid PU foam of the invention (polyurethane or polyisocyanurate foam).

The invention further provides for the use of the rigid PU foam as insulation material in refrigeration technology, in refrigeration equipment, in the construction sector, automobile sector, shipbuilding sector and/or electronics sector, as insulation panels, as spray foam, as one-component foam.

The subject-matter of the invention will be described by way of example below, without any intention that the invention be restricted to these illustrative embodiments. Where ranges, general formulae or classes of compounds are specified hereinbelow, these are intended to encompass not only the corresponding ranges or groups of compounds which are explicitly mentioned but also all subranges and subgroups of compounds which can be obtained by removing individual values (ranges) or compounds. When documents are cited in the context of the present description, the contents thereof, particularly with regard to the subject matter that forms the context in which the document has been cited, are considered in their entirety to form part of the disclosure content of the present invention. Unless stated otherwise, percentages are figures in percent by weight. When average values are reported below, the values in question are weight averages, unless stated otherwise. When parameters which have been determined by measurement are reported below, the measurements have been carried out at a temperature of 25° C. and a pressure of 101 325 Pa, unless stated otherwise.

The examples adduced hereinafter describe the present invention by way of example, without any intention that the invention, the scope of application of which is apparent from the entirety of the description and the claims, be restricted to the embodiments specified in the examples.

EXAMPLES

The polyether-modified siloxanes (PES) used were the following materials:
PES No. 1, as described in WO2011/012390 A1, Example 4.
PES No. 2, as described in WO2011/012390 A1, Example 5.
PES No. 3, as described in EP 1544235 A1, Example 14.

The polyalkylsiloxanes (PAS) used were the following materials conforming to the formula (1), $M_a D_b T_c Q_d$, as defined above. These are summarized in Table 2.

TABLE 2

Description of the polyalkylsiloxanes

| Example | a | b | c | d | $R^{11}$ | $R^{12}$ | $R^{13}$ | $R^{14}$ | $R^{15}$ | $R^{16}$ |
|---|---|---|---|---|---|---|---|---|---|---|
| PAS No. 1 | 3 | 0 | 1 | 0 | Me | Me | Me | — | — | Me |
| PAS No. 2 | 3 | 0 | 1 | 0 | Me | Me | Me | — | — | vinyl |
| PAS No. 3 | 4 | 0 | 0 | 1 | Me | Me | Me | — | — | — |
| PAS No. 4 | 4 | 0 | 2 | 0 | Me | Me | Me | — | — | Me |
| PAS No. 5 | 2 | 1 | 0 | 0 | Me | Me | Me | Octyl | Me | — |
| PAS No. 6 | 2 | 1 | 0 | 0 | Me | Me | Me | Ethyl | Me | — |
| PAS No. 7 | 4 | 1 | 2 | 0 | Me | Me | Me | Me | Me | — |
| PAS No. 8 | 2 | 2-4 | 0 | 0 | Me | Me | Me | Me, Cl-propyl | Me | — |
| PAS No. 9 | 2 | 3-5 | 0 | 0 | Me | Me | Me | Me | Me | — |
| PAS No. 10 | 2 | 3-7 | 0 | 0 | Me | Me | Me | Me | Me | — |
| PAS No. 11 | 0 | 5 | 0 | 0 | — | — | — | Me | Me | — |
| PAS No. 12 | 6 | 0 | 4 | 0 | Me | Me | Me | — | — | Me |

For the inventive production of rigid PU foams, the polyether-modified siloxane and polysiloxanes were used in a mixture or combination.

This was done using the following mixtures that are summarized in Table 3.

TABLE 3

Description of the PAS/PES mixtures (overview of PAS/PES combinations)

| Mixtures | PES | Proportion by weight | PAS | Proportion by weight |
|---|---|---|---|---|
| Mixture 1 | No. 1 | 98 | No. 1 | 2 |
| Mixture 2 | No. 1 | 98 | No. 8 | 2 |
| Mixture 3 | No. 1 | 98 | No. 10 | 2 |
| Mixture 4 | No. 2 | 98 | No. 1 | 2 |
| Mixture 5 | No. 2 | 98 | No. 2 | 2 |
| Mixture 6 | No. 2 | 98 | No. 3 | 2 |
| Mixture 7 | No. 2 | 98 | No. 4 | 2 |
| Mixture 8 | No. 2 | 98 | No. 5 | 2 |
| Mixture 9 | No. 2 | 98 | No. 6 | 2 |
| Mixture 10 | No. 2 | 95 | No. 7 | 5 |
| Mixture 11 | No. 2 | 98 | No. 10 | 2 |
| Mixture 12 | No. 2 | 98 | No. 11 | 2 |
| Mixture 13 | No. 3 | 98 | No. 1 | 2 |
| Mixture 14 | No. 3 | 98 | No. 7 | 2 |
| Mixture 15 | No. 3 | 95 | No. 7 | 5 |
| Mixture 16 | No. 3 | 98 | No. 9 | 2 |
| Mixture 17 | No. 3 | 98 | No. 10 | 2 |
| Mixture 18 | No. 3 | 95 | No. 10 | 5 |
| Mixture 19 | No. 3 | 98 | No. 12 | 2 |

Foams were produced using the following raw materials:
Stepanpol PS 2352: polyester polyol from Stepan
Stepanpol PS 2412: polyester polyol from Stepan
Terate HT 5511: polyester polyol from Invista
TCPP: tris(2-chloroisopropyl) phosphate from Fyrol
Kosmos 75 from Evonik Industries AG, catalyst based on potassium octoate
Polycat 5 from Evonik Nutrition & Care GmbH, amine catalyst
MDI (44V20): Desmodur 44V20L from Covestro, diphenylmethane 4,4'-diisocyanate (MDI) with isomeric and higher-functionality homologues Examples: Production of PU Foams Foaming was carried out by manual mixing. For this purpose, the compounds according to the invention, polyols, flame retardants, catalysts, water, siloxane surfactants according to the invention or not according to the invention, polyalkylsiloxanes according to the invention and blowing agents were weighed into a beaker and mixed with a disc stirrer (diameter 6 cm) at 1000 rpm for 30 seconds. The blowing agent quantity which had evaporated during the mixing operation was determined by reweighing and replenished. Subsequently, the isocyanate (MDI) was added, and the reaction mixture was stirred with the stirrer described at 3000 rpm for 5 s.

In the case of the PIR formulations used here, for panel applications, for example building insulation, the mixture was introduced immediately into an aluminium mould of dimensions 50 cm×25 cm×7 cm which had been heated to 65° C. The use amount of foam formulation was such that the amount was sufficient for minimum filling of the mould. The foams were demoulded after 10 minutes and then stored at room temperature for 24 hours.

A cut surface in the foam was used to visually assess the degree of internal defects and the pore structure on a scale from 1 to 10, where 10 represents an impeccable foam and 1 a very significantly defective foam.

The thermal conductivity coefficient (λ value in mW/m·K) was measured on 2.5 cm-thick sheets with a device of the Hesto Lambda Control type, model HLC X206, at an average temperature of 10° C. in accordance with the specifications of standard EN12667:2001.

Table 4 summarizes the foam formulations used.

TABLE 4

(figures in parts by weight)

|  | Formulation Example | | |
|---|---|---|---|
|  | PIR-1 | PIR-2 | PIR 3 |
| PS 2412 | 100 | | |
| PS 2352 | | 100 | |
| HT 5511 | | | 100 |
| DABCO TMR 12 | 2.5 | 2.5 | 2.5 |
| Polycat 5 | 0.5 | 0.5 | 0.5 |
| Siloxane mixture | 2.5 | 2.5 | 2.5 |
| TCPP | 8 | 15 | 13 |
| Water | 0.5 | 0.5 | 0.5 |
| Isopentane | 10.5 | 10.5 | 10.5 |
| Cyclopentane | 4.5 | 4.5 | 4.5 |
| MDI (44V20) | 200 | 200 | 200 |

Foaming results with the siloxane mixtures

In accordance with the compositions of the mixtures, the following PES are used as noninventive comparative examples and compared with the associated inventive mixtures:

PES No. 1 compared with Mixtures 1 to 3
PES No. 2 compared with Mixtures 4 to 12
PES No. 3 compared with Mixtures 13 to 19

TABLE 5

Summary of the foaming experiments with various siloxane mixtures and foam formulations

| Foam Example | Siloxane mixture | Formulation No. | Lambda | Internal defects |
|---|---|---|---|---|
| Comp. 1 | PES No. 1 (noninventive) | 1 | 22.1 | 8 |
| 1 | Mixture 1 | 1 | 21.4 | 8 |
| 2 | Mixture 2 | 1 | 21.8 | 9 |
| 3 | Mixture 3 | 1 | 21.4 | 8 |
| Comp. 2 | PES No. 1 (noninventive) | 3 | 22.4 | 8.5 |
| 4 | Mixture 1 | 3 | 21.6 | 9 |
| Comp. 3 | PES No. 2 (noninventive) | 3 | 23.4 | 7.5 |
| 5 | Mixture 11 | 3 | 21.2 | 8 |
| Comp. 4 | PES No. 2 (noninventive) | 3 | 22.8 | 7.5 |
| 6 | Mixture 4 | 2 | 21.6 | 8 |
| 7 | Mixture 5 | 2 | 21.7 | 8.5 |
| 8 | Mixture 6 | 2 | 21.6 | 8 |
| 9 | Mixture 7 | 2 | 21.5 | 9 |
| 10 | Mixture 8 | 2 | 21.7 | 8.5 |
| 11 | Mixture 9 | 2 | 21.4 | 8 |
| 12 | Mixture 10 | 2 | 21.1 | 7.5 |
| 13 | Mixture 11 | 2 | 21.5 | 8 |
| 14 | Mixture 12 | 2 | 21.5 | 9 |
| Comp. 5 | PES No. 3 (noninventive) | 2 | 22.1 | 8 |
| 15 | Mixture 13 | 2 | 21.1 | 8 |
| 16 | Mixture 14 | 2 | 21.4 | 9.5 |
| 17 | Mixture 15 | 2 | 21.5 | 8.5 |
| 18 | Mixture 16 | 2 | 21.7 | 9.5 |
| 19 | Mixture 17 | 2 | 21.5 | 9.5 |
| 20 | Mixture 18 | 2 | 21.3 | 8 |
| 21 | Mixture 19 | 2 | 21.4 | 9 |

It is clear from the experiments that the mixtures according to the invention consisting of polyethersiloxanes and polyalkylsiloxanes lead to improved insulation properties.

It should be particularly emphasized here that even a very small addition of PAS according to the invention leads to measurable improvements.

The invention claimed is:

1. A composition for production of rigid polyurethane foam, the composition comprising at least one isocyanate component, a polyol component, optionally a catalyst that catalyses the formation of a urethane or isocyanurate bond, optionally blowing agents, where the composition additionally comprises:
   i) a polyalkylsiloxane composition comprising at least one poly alkylsiloxane containing no polyether modification comprising a polyalkylsiloxane having a structure

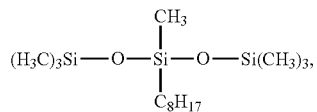

and
   ii) a polyether-modified siloxane.

2. The composition according to claim 1, wherein said polyalkylsiloxane composition further comprises a polyalkylsiloxane having no polyether modification having less than 20 silicon atoms.

3. The composition according to claim 2, wherein the polyalkylsiloxane having no polyether modification having less than 20 silicon atoms conforms to the formula 1:

$$M_a D_b T_c Q_d \quad \text{(Formula 1)}$$

where
$M = R^{11}R^{12}R^{13}SiO_{1/2}$
$D = R^{14}R^{15}SiO_{2/2}$
$T = R^{16}SiO_{3/2}$
$Q = SiO_{4/2}$ where
$R^{11}, R^{12}, R^{13}, R^{14}, R^{15}, R^{16}$ = identical or different hydrocarbon radicals having 1 to 12 carbon atoms, where the hydrocarbon radicals are optionally substituted by heteroatoms, excluding oxygen, or else H,
and wherein
$a = 2$ to $6$
$b = 0$ to $8$,
$c = 0$ to $4$,
$d = 0$ to $2$,
wherein $a + b + c + d < 20$.

4. The composition according to claim 3, wherein $c + d > 0.5$.

5. The composition according to claim 3, wherein $d = 0$ and $c > 0.5$.

6. The composition according to claim 3, wherein $c + d < 0.5$.

7. The composition according to claim 3, wherein $R^{16}$ is different from $R^{11}, R^{12}, R^{13}, R^{14}$ and $R^{15}$.

8. The composition according to claim 3, wherein $R^{11}, R^{12}$ and $R^{13}$ are different.

9. The composition according to claim 3, wherein $R^{11}, R^{12}, R^{13}, R^{14}, R^{15}, R^{16}$ = identical or different hydrocarbon radicals having 1 to 8 carbon atoms, wherein $a + b + c + d < 11$.

10. The composition according to claim 3, wherein $c + d > 1$.

11. The composition according to claim 5, wherein c+d <0.1.

12. The composition according to claim 3, wherein $R^{11}$, $R^{12}$, $R^{13}$, $R^{14}$, $R^{15}$, $R^{16}$=identical or different hydrocarbon radicals selected from the group consisting of phenyl-, $CH_3$—, $CH_3CH_2$—, $CH_2CH$—, $ClCH_2CH_2CH_2$— and H—.

13. The composition according to claim 2, wherein the polyalkylsiloxane having no polyether modification contains less than 11 silicon atoms.

14. The composition according to claim 1, wherein the polyalkylsiloxane composition is used in combination with said polyether-modified siloxane in a mass ratio of from 1:5 to 1:200.

15. The composition according to claim 1, wherein the proportion by mass of the total amount of polyalkylsiloxane composition and polyether-modified siloxanes, based on 100 parts by mass of polyol component, is from 0.1 to 10 pphp.

16. The composition according to claim 1, wherein the proportion by mass of the total amount of polyalkylsiloxane composition and polyether-modified siloxanes, based on 100 parts by mass of polyol component, is from 1 to 3 pphp.

17. The process for producing rigid polyurethane foam by reacting one or more polyol components with one or more isocyanate components, wherein the reaction is effected in the presence of i) a polyalkylsiloxane composition comprising at least one polyalkylsiloxane containing no polyether modification comprising a polyalkylsiloxane having a structure

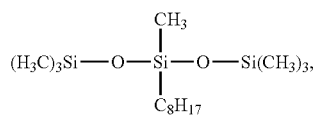

and ii) a polyether-modified siloxane, using a composition according to claim 1.

18. The rigid polyurethane foam obtained by the process according to claim 17.

19. An insulant comprising the rigid polyurethane foam according to claim 18.

* * * * *